(12) United States Patent
Shiokawa et al.

(10) Patent No.: US 8,307,254 B2
(45) Date of Patent: Nov. 6, 2012

(54) RADIO COMMUNICATION SYSTEM

(75) Inventors: Masato Shiokawa, Tokyo (JP);
Kunifusa Maruyama, Tokyo (JP)

(73) Assignee: NEC Corporation, Tokyo (JP)

( * ) Notice: Subject to any disclaimer, the term of this patent is extended or adjusted under 35 U.S.C. 154(b) by 671 days.

(21) Appl. No.: 12/470,197

(22) Filed: May 21, 2009

(65) Prior Publication Data

US 2009/0300464 A1    Dec. 3, 2009

(30) Foreign Application Priority Data

May 28, 2008    (JP) .................. 2008-139418

(51) Int. Cl.
*H03M 13/00*    (2006.01)
(52) U.S. Cl. .................. 714/758; 714/786; 714/755
(58) Field of Classification Search .................. 714/758, 714/746, 704, 786, 755, 752
See application file for complete search history.

(56) References Cited

U.S. PATENT DOCUMENTS

| | | | |
|---|---|---|---|
| 6,078,631 A * | 6/2000 | Yabe et al. | 340/7.34 |
| 6,772,378 B1 * | 8/2004 | Ishihara et al. | 714/704 |
| 7,240,270 B2 * | 7/2007 | Bellier et al. | 714/746 |
| 7,653,026 B2 * | 1/2010 | Obuchi et al. | 370/331 |
| 7,941,626 B2 * | 5/2011 | Marinier et al. | 711/167 |

FOREIGN PATENT DOCUMENTS

| | | |
|---|---|---|
| JP | 2004503130 A | 1/2004 |
| JP | 200705916 A | 1/2007 |
| JP | 2007525095 A | 8/2007 |

OTHER PUBLICATIONS

Japanese Office Action for JP2008-139418 mailed on Mar. 27, 2012.

* cited by examiner

*Primary Examiner* — Fritz Alphonse

(57) ABSTRACT

A base station creates a dummy pattern added with an error correction code, during occurring of a control channel not allocated for transmission of control information, transmits the dummy pattern instead of control information at a power level lower than a normal power level. A mobile station decodes control information transmitted through the control channel, examines whether or not a value specified by the decoded control information is within a suitable range, and performs error detection of the decoded control information. The mobile station stops decoding of data transmitted through a data channel, upon judging that the value is not within the suitable range or detecting an error in the error detection.

24 Claims, 10 Drawing Sheets

RADIO COMMUNICATION SYSTEM

This application is based upon and claims the benefit of priority from Japanese patent application No. 2008-139418 filed on May 28, 2008, the disclosure of which is incorporated herein in its entirety by reference.

TECHNICAL FIELD

The present invention relates to a radio communication system and, more particularly, to a radio communication system including a base station and a mobile station. The present invention also relates to a method for transmitting and receiving control information through a control channel, and a recording medium storing therein a computer program defining such a method.

BACKGROUND ART

In a radio communication system including at least one base station and a plurality of mobile stations, the base station generally transmits to the mobile stations user data through a downlink data channel and control information through a downlink control channel for each of radio frames. The downlink control channel is used to notify the mobile stations of control information, such as decoding parameters, of the downlink data channel. The radio frames transmitted from the base station to the mobile stations may include a radio frame which includes therein no downlink data. Since such a radio frame does not need a downlink control signal, it is desired to allow the downlink control channel to have therein no transmission power (i.e., be set to a "DTX mode", referred to as simply DTX hereinafter) in consideration of suppressing interference with a signal transmitted from another sector or another base station.

More specifically, if there arises a mobile station which does not need transmission of information through the downlink data channel and thus the radio resources allocated to the mobile stations include a radio resource which is not used as the downlink control channel, it is desirable that the radio resource of the corresponding downlink control channel be set to DTX. Patent Publication JP-2007-525095A, for example, describes a related technique for solving a problem occurring in the communication system wherein the control channel is set to DTX.

In the related technique, the mobile station judges presence or absence of the downlink control information based on the result of decoding the downlink control channel, i.e., control information transmitted through the downlink control channel. That is, if the base station sets the downlink control channel to DTX, the result of decoding the error-correction code of the downlink control channel involves random values due to the noise of the communication path, whereby the decoded result is not divisible by the CRC (cyclic redundancy checksum)-generating polynomial, i.e., the result of CRC decoding is CRC=NG. On the other hand, if the base station transmits a variety of control signals through the downlink control channel, the decoded result is generally divisible by the CRC-generating polynomial, i.e., the result of CRC decoding is CRC=OK (in order). Thus, the mobile station can judge the presence or absence of the downlink data channel based on the judgment whether the result of CRC decoding is CRC=OK or CRC=NG.

However, since the result of CRC decoding of the downlink control channel set to DTX by the base station includes random values, the downlink control channel may be sometimes miss-judged as CRC=OK in the result of CRC decoding at some probability. For example, if the CRC is a hexadecimal-notation CRC, there arises a case where the result of CRC decoding is judged as divisible by the CRC-generating polynomial at a frequency of $2^{-16}$ ($10^{-5}$), to incur an erroneous detection of CRC=OK. The erroneous detection causes the mobile station to decode the downlink data channel that is set to DTX, based on the result of decoding the downlink control channel, thereby incurring a large number of error bits in the mobile station.

As to the uplink control channel that specifies the contents of the uplink data channel, there occurs a problem similar to the above problem occurring in the downlink control channel. More specifically, if there is a mobile station for which instruction of transmission of data through the uplink data channel is not needed, and thus there occurs a radio resource not used for transmission of data through the uplink control channel among the radio resources allocated to the uplink control channels, the base station sets the radio resource for the mobile station to DTX. Setting of the radio resource or uplink control channel to DTX when there is no uplink data channel through which data transmission is instructed, prevents occurring of interference with a signal transmitted from another sector or another base station. In this case, if the result of CRC decoding is CRC=OK for the uplink control channel that is set to DTX, the base station performs coding of own data based on the erroneous result of decoding the uplink control channel, to thereby incur the problem of transmission of incorrect data.

In view of the above problem in the related art, Patent Publication-1 describes a solution to the problem by judging whether or not the frame satisfies a quality test, analyzing at least a part of the bits in the frame if the result of quality test is NG, and judging whether or not the number of analyzed bits exceeds a threshold. In this technique, if the number of analyzed bits does not exceed the threshold, the receiving station concludes that the frame is set to DTX. More specifically, the receiving station counts the number of bits having data of zero in the end portion of the frame, and judges whether or not the number of bits having data of zero exceeds the threshold. If the number of bits having data of zero does not exceed the threshold, the receiving station further judges whether or not the frame includes an expected bit sequence. If the frame does not include the expected bit sequence, the frame is judges as DTX. However, in this technique, it is in fact difficult to correctly judge whether or not the frame is set to DTX based on the judgment using the threshold.

SUMMARY OF THE INVENTION

It is therefore an object of the present invention to provide a radio communication system which is capable of suppressing occurring of bit errors in the received data and transmission of incorrect data while preventing interference with a signal transmitted from another sector or another base station.

It is another object of the present invention to provide a communication method used in the above radio communication system, and a recording medium that defines the communication method.

It is another object of the present invention to provide a base station and a mobile station which can be used in the above radio communication system and can use the above communication method.

The present invention provides, in a first aspect thereof, a communication method including the steps of: creating a dummy pattern added with an error correction code in a base station, during occurring of a downlink or uplink control channel that is not allocated for transmission of control information; transmitting the dummy pattern instead of control information from the base station to a mobile station through the downlink or uplink control channel that is not allocated for transmission of control information; decoding control information transmitted through any downlink or uplink control channel, examining whether or not a first value specified by the decoded control information is within a suitable range, and performing error detection of the decoded control information, in any mobile station; and stopping decoding of data transmitted through a downlink data channel or coding of data to be transmitted through an uplink data channel in the any mobile station, upon judging that the first value is not within the suitable range or detecting an error in the error detection of the decoded control information.

The present invention provides, in a second aspect thereof, a method for transmitting control information, including: creating a dummy pattern added with an error correction code, during occurring of a downlink or uplink control channel that is not allocated for transmission of control information; and transmitting the dummy pattern instead of control information through the downlink or uplink control channel that is not allocated for transmission of control information, wherein the dummy pattern added with the error correction code includes error information and/or wherein the transmitting transmits the dummy pattern at a first power level that is lower than a power level of normal transmission of control data.

The present invention provides, in a third aspect thereof, a method for receiving control information, including the steps of: decoding control information transmitted through a downlink or uplink control channel; examining whether or not a first value specified by the decoded control information is within a suitable range; performing error detection of the decoded control information; and stopping decoding of data transmitted through a downlink data channel or coding of data to be transmitted through an uplink data channel, upon judging that the first value is not within the suitable range or detecting an error in the error detection of the decoded control information.

The present invention provides, a fourth aspect thereof, a base station including: a dummy-pattern creation section that creates a dummy pattern added with an error correction code, during occurring of a downlink or uplink control channel that is not allocated for transmission of control information, the dummy pattern added with the error correction code including error information; and a radio section that transmits the dummy pattern instead of control information through the downlink or uplink control channel that is not allocated for transmission of control information, wherein the dummy pattern added with the error correction code includes error information and/or wherein the radio section transmits the dummy pattern at a first power level that is lower than a power level of normal transmission of control data.

The present invention provides, in a fifth aspect thereof, a mobile station including: a control-channel decoding section that decodes control information transmitted through a downlink or uplink control channel from a base station; a control-signal inspection section that examines whether or not a first value specified by the decoded control information is within a suitable range; an error detection section that performs error detection of the decoded control information based on an error detection code added in the base station; and a data-channel decoding section that stops decoding of data transmitted through a downlink data channel or coding of data to be transmitted through an uplink data channel, upon judging that the first value is not within the suitable range or detecting an error in the error detection of the decoded control information.

The present invention provides, in a sixth aspect thereof, a communication system including: a base station including a dummy-pattern creation section that creates a dummy pattern added with an error correction code, during occurring of a downlink or uplink control channel that is not allocated for transmission of control information, and a radio section that transmits the dummy pattern instead of control information to a mobile station through the downlink or uplink control channel that is not allocated for transmission of control information; and a mobile station including a control-channel decoding section that decodes control information transmitted through the downlink or uplink control channel, a control-information inspection section that examines whether or not a first value specified by the decoded control information is within a suitable range, an error detection section that performs error detection of the decoded control information, and a data-channel decoding section that stops decoding of a downlink data channel or coding of an uplink data channel, when the control-information inspection section judges that the first value is not within the suitable range or the error detection section detects an error in the decoded control information.

The present invention provides, in a seventh aspect thereof, a computer-readable medium encoded with a program running on a computer, wherein the program causes the computer to: create a dummy pattern added with an error correction code, during occurring of a downlink or uplink control channel that is not allocated for transmission of control information; and transmit the dummy pattern instead of control information through the downlink or uplink control channel that is not allocated for transmission of control information, wherein the dummy pattern added with the error correction code includes error information and/or wherein the dummy pattern is transmitted at a first power level that is lower than a power level of normal transmission of control data.

The present invention provides, in an eight aspect thereof, a computer-readable medium encoded with a program running on a computer, wherein the program causes the computer to: decode control information transmitted through a downlink or uplink control channel; examine whether or not a first value specified by the decoded control information is within a suitable range; perform error detection of the decoded control information; and stop decoding of data transmitted through a downlink data channel or coding of data to be transmitted through an uplink data channel, upon judging that the first value is not within the suitable range or detecting an error in the error detection of the decoded control information.

The above and other objects, features and advantages of the present invention will be more apparent from the following description, referring to the accompanying drawings.

EXEMPLARY EMBODIMENTS

The radio communication system of the present invention has a minimum configuration that includes: creating a dummy pattern added with an error correction code in a base station, during occurring of a downlink or uplink control channel that is not allocated for transmission of control information; transmitting the dummy pattern instead of control information from the base station to a mobile station through the downlink or uplink control channel that is not allocated for transmission of control information; decoding control information transmitted through any downlink or uplink control channel, examining whether or not a first value specified by the decoded control information is within a suitable range, and performing error detection of the decoded control information, in any mobile station; and stopping decoding of data transmitted through a downlink data channel or coding of data to be transmitted through an uplink data channel in the any mobile station, upon judging that the first value is not within the suitable range or detecting an error in the error detection of the decoded control information.

In accordance with the above minimum configuration of the present invention, if the mobile station finds an error of the information transmitted through the downlink or uplink control channel, the mobile station stops decoding of data transmitted through a downlink data channel or coding of own data to be transmitted through an uplink data channel from the mobile station. Thus, the mobile station does not perform decoding of unnecessary data in the downlink data channel or coding of own data to be transmitted through the uplink data channel by using wrong control information. This prevents the mobile station from performing an unnecessary processing or transmitting incorrect data.

Figure 1:
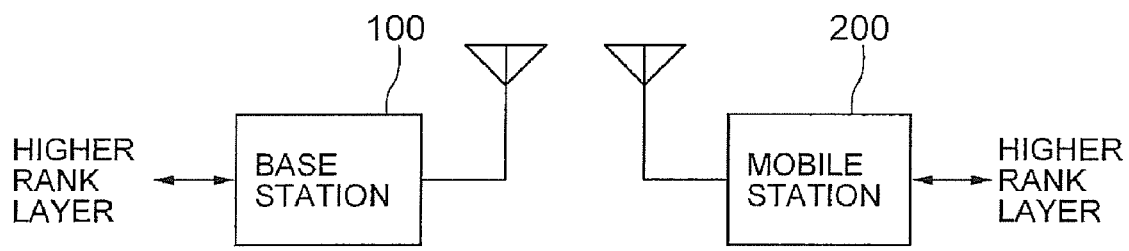
FIG. 1 is a block diagram showing a radio communication system according to a first embodiment of the present invention.

Now, exemplary embodiments of the present invention will be described with reference to accompanying drawings, wherein similar constituent elements are designated by similar reference numerals throughout the drawings. FIG. 1 shows a radio communication system according to a first exemplary embodiment of the present invention. The radio communication system includes at least one base station 100, and at least one mobile station 200. The base station 100 and the mobile station 200 perform transmission/reception of a variety of species of data therebetween by using a radio communication network. A single base station 100 generally corresponds to a plurality of mobile stations 200 received in a cell managed by the base station 100. The base station 100 and mobile station 200 also transmit data between the same and a higher rank layer.

Figure 2:
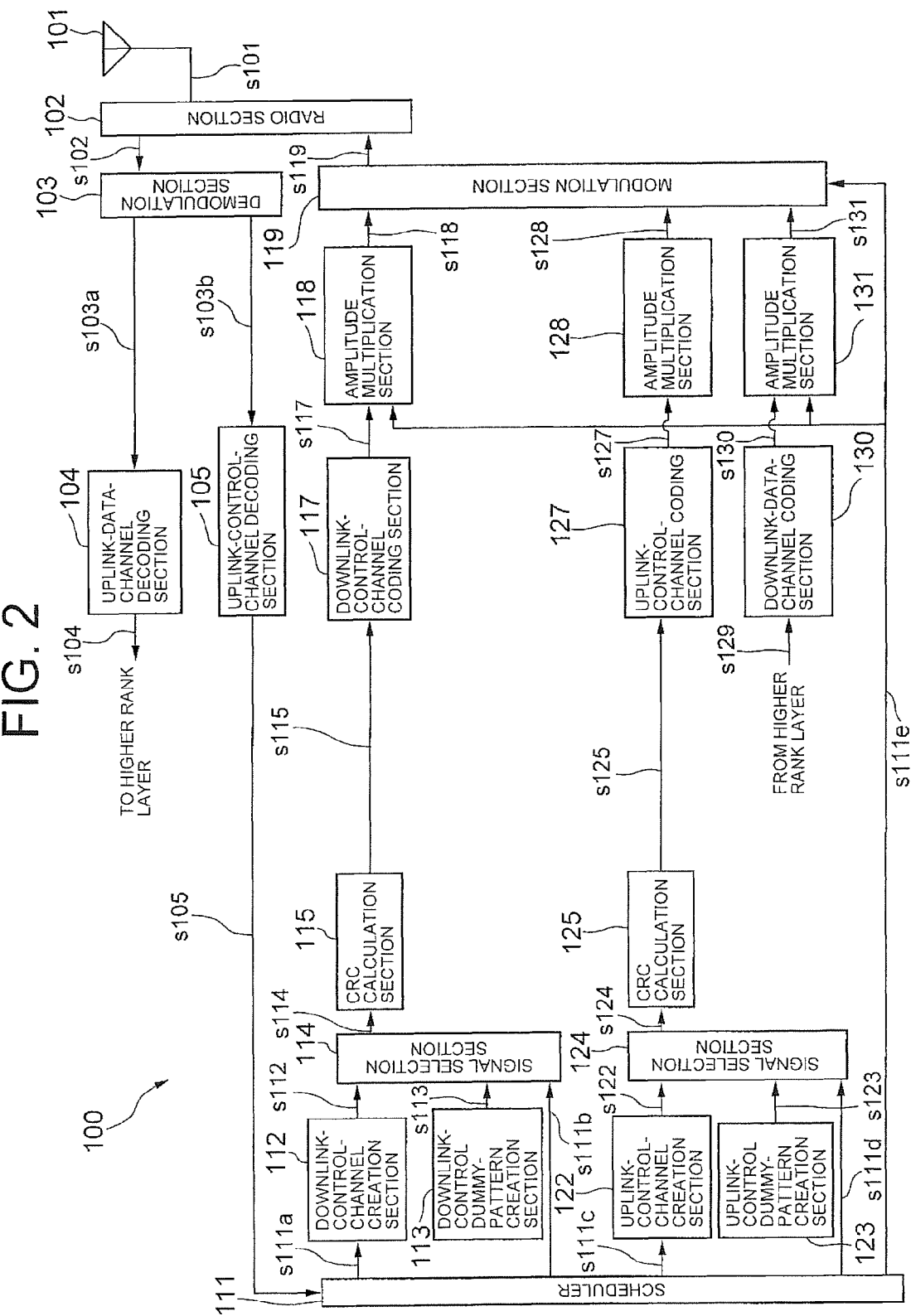
FIG. 2 is a block diagram showing the configuration of the base station shown in FIG. 1.

FIG. 2 exemplifies the configuration of the base station 100 shown in FIG. 1. The base station 100 includes an antenna 101, a radio section 102, a demodulation section 103, an uplink-data-channel decoding section 104, an uplink-control-channel decoding section 105, a scheduler 111, a downlink-control-channel creation section 112, a downlink-control dummy-pattern creation section 113, a signal selection section 114, a CRC calculation section 115, a downlink-control-channel coding section 117, an amplitude multiplication section 118, a modulation section 119, an uplink-control-channel creation section 122, an uplink-control dummy-pattern creation section 123, a signal selection section 124, a CRC calculation section 125, an uplink-control-channel coding section 127, an amplitude multiplication sections 128, 131, and a down-link-data-channel coding section 130.

The transmission path used by the base station 100 in the present embodiment will be described first. The scheduler 111 determines the assignment (allocation) of the radio resource to each mobile station 200 based on the uplink-control signal s105 delivered from the uplink-control-channel decoding section 105. The scheduler 111 delivers control signals s111a, s111b, s111c, and s111d to the downlink-control-channel creation section 112, signal selection section 114, uplink-control-channel creation section 122, and signal selection section 124, respectively, based on the thus determined assignment in each radio frame. The scheduler 111 delivers a control signal s111e to the amplitude multiplication sections 118, 128, and 131, and modulation section 119. The scheduler 111 controls these sections by using the control signals thus output to those sections.

The downlink-control-channel creation section 112 creates signaling information of the downlink data channel. The downlink control channel represents the contents of the corresponding downlink data channel. The downlink-control-channel creation section 112 creates the signaling information of the downlink data channel, such as resource-block allocation information for each mobile station, a HARQ process number, a retransmission sequence number, etc. for each radio frame, if a LTE (long term evolution) system is used wherein each user uses a dedicated frequency band.

The downlink-control dummy-pattern creation section 113 creates a downlink-control dummy-pattern signal s113. The contents of the downlink-control dummy-pattern signal s113 have a value that represents absence of a user to whom a radio resource is assigned. For example, if a system wherein each user uses a dedicated frequency band, the downlink-control dummy-pattern creation section 113 creates, as a downlink-control dummy-pattern signal s113, a bit pattern wherein all the bits that notify the number of occupied resource blocks corresponding to the frequency band used by the user among the signaling information of the downlink data channel are set to zero. In an alternative, the downlink-control dummy-pattern creation section 113 may create a downlink-control dummy-pattern signal s113 wherein the bits that specify the resource-block allocation information are set to a specific pattern. As to the other control information expressed by the downlink-control dummy-pattern signal s113, the value thereof may be out of a suitable range.

The signal selection section 114 selects one of an output signal s112 from the downlink-control-channel creation section 112 and a downlink-control dummy-pattern signals s113 from the downlink-control dummy-pattern creation section 113 based on the control signal s111b. The output signal s114 from the signal selection section 114 is input to the CRC calculation section 115.

The CRC calculation section 115 adds or appends an error detecting code for detecting an error in the receiving side. The CRC calculation section 115 performs CRC calculation using a hexadecimal-generating polynomial, for example, and adds surplus 16 bits to the signal s114 input from the signal selection section 114. The downlink-control-channel coding section 117 performs error correction coding, such as a convolution coding. The amplitude multiplication section 118 multiplies the downlink-control-channel signal s117 output from the downlink-control-channel coding section 117 by an amplitude based on the instruction from the scheduler 111, to output a downlink control signal s118.

The uplink-control-channel creation section 122 creates coding information on the uplink data channel through which the mobile station 200 performs transmission of uplink data. The uplink-control-channel creation section 122 creates coding information of the uplink data channel, such as resource-block allocation information, HARQ process number, and retransmission sequence number, for each radio frame, if the LTE system is used wherein each user uses a dedicated frequency band.

The uplink-control dummy-pattern creation section 123 creates an uplink-control dummy-pattern signal s123. The contents of the uplink-control dummy-pattern signal s123 have a value that represents absence of a user to whom the radio resource is allocated. For example, the uplink-control dummy-pattern creation section 123 creates, as an uplink-control dummy-pattern signal, a bit pattern wherein all the bits that notify the number of occupied resource blocks corresponding to the frequency band used by the user among the coding information of the uplink data channel are set to zero, if the LTE system is used wherein each user uses a dedicated frequency band. In an alternative, the uplink-control dummy-pattern signal s123 may be such that the bits specifying the information of resource-block allocation have a specific bit pattern. In a further alternative, the information specified by the uplink-control dummy-pattern signal s123 may have a value out of a suitable range.

The signal selection section 124 selects one of the output signal s122 from the uplink-control-channel creation section 122 and the uplink-control dummy-pattern signal s123 output from the uplink-control dummy-pattern creation section 123, based on the control signal s111d, to deliver the selected output. The output signal s124 from the signal selection section 124 is delivered to the CRC calculation section 125.

The CRC calculation section 125 configures an error-code addition section that adds an error correction code for performing an error correction based thereon in the receiving side. The CRC calculation section 125 performs CRC calculation using hexadecimal-generating polynomial, for example, and adds surplus 16 bits to the signal s124 delivered from the signal selection section 124. The uplink-control-channel coding section 127 performs error correction coding, such as a convolution coding. The amplitude multiplication section 128 performs multiplication of the uplink-control-channel signal s127 by an amplitude based on the instruction from the scheduler 111, to output an uplink-control signal s128.

The downlink-data-channel coding section 130 performs error correction coding, such as a turbo coding, of data delivered through the downlink data channel from a higher rank layer, to output a downlink-data-channel signal s130. The amplitude multiplication section 131 performs multiplication of the downlink-data-channel signal s130 by an amplitude based on the instruction from the scheduler 111, to output a downlink-data signal s131.

The modulation section 119 receives the downlink control signal s118 multiplied by the amplitude, uplink-control signal s128, and downlink-data signal s131. The modulation section 119 generates a transmission signal allocated to the resource block transmitting the downlink transmission signal of each channel or an OFDM symbol, based on the control signal s111e from the scheduler 111. Generation of the transmission signal includes modulation coding and spread processing. The output data s119 from the modulation section 119 is delivered to the radio section 102. The radio section 102 converts the output data s119 into an RF-band signal, to deliver the thus converted signal through the antenna 101.

Next, the signal path on the receiving side of the base station 100 will be described. The radio section 102 converts the signal s101 received through the antenna 101 into a baseband signal s102. The demodulation section 103 demodulates data of the uplink data channel from the baseband signal s102, and calculates a soft-decision value s103a. The demodulation performed by the demodulation section 103 includes de-spreading of the received data and calculation of the complex signal to recover the soft decision data. The demodulation section 103 also calculates the uplink-control-channel data s103b from the baseband signal s102.

The uplink-data-channel decoding section 104 performs error correction decoding of the soft-decision value s103a. The uplink-data-channel decoding section 104 is configured, for example, as a Viterbi decoder having a convolution coding function. The decoded result s104 is delivered from the uplink-data-channel decoding section 104 to the higher rank layer. The uplink-control-channel decoding section 105 performs error correction decoding of the uplink-control-channel data 103b. The uplink-control-channel decoding section 105 is configured, for example, as a turbo decoder. The uplink-control-channel decoding section 105 outputs an uplink-control signals 105, i.e., the decoded result, to the scheduler 111.

Figure 3:
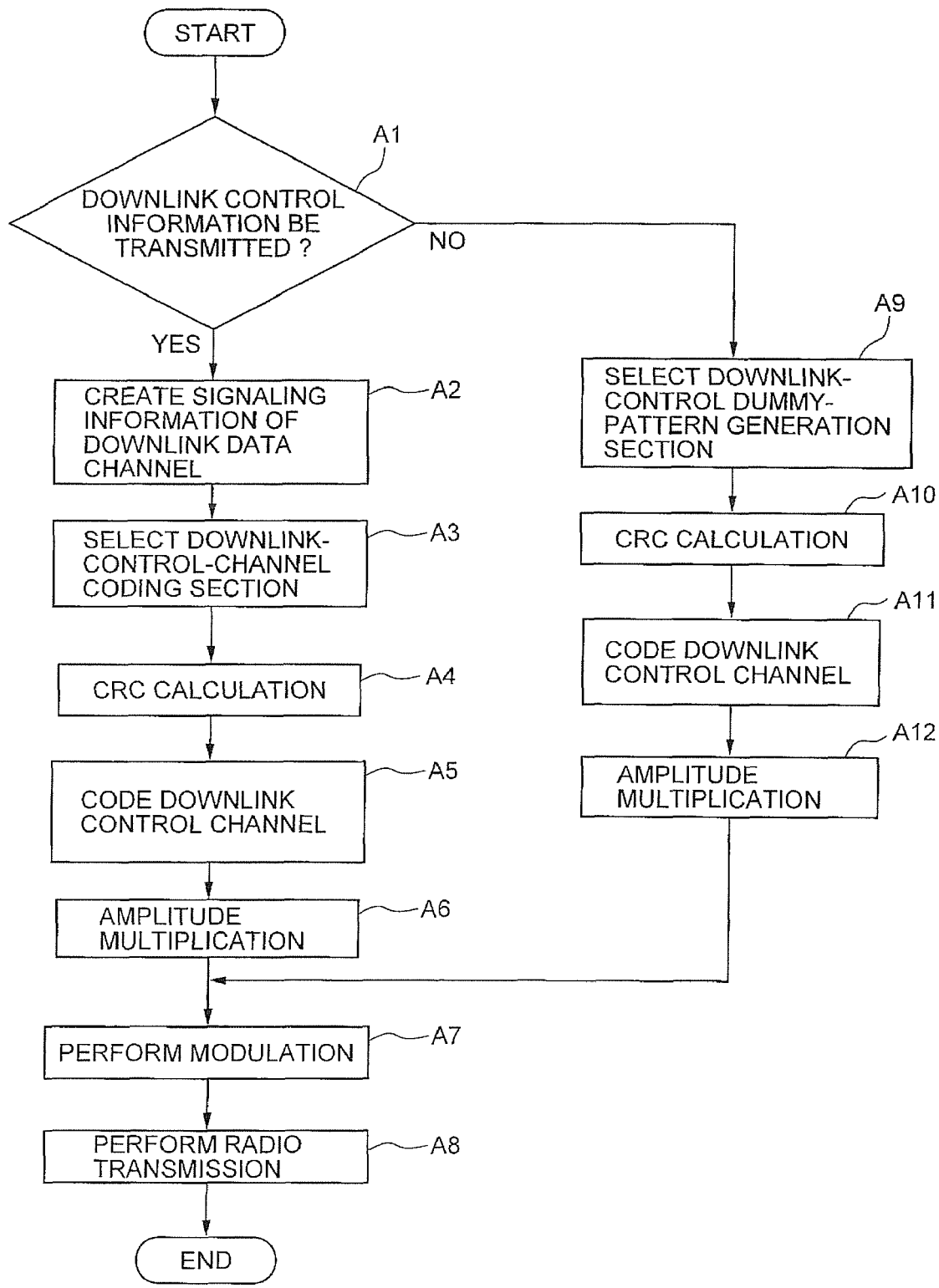
FIG. 3 is a flowchart showing the procedure of transmission of control information through the downlink control channel in the base station.

FIG. 3 shows the procedure of operation in the base station 100 during transmission of data through the downlink control channel. The scheduler 111 judges whether or not the downlink control channel is to be used for transmission of control information (step A1) The scheduler 111 judges that transmission of data through the downlink-control-channel is not needed, if there occurs a mobile station for which transmission of data through the downlink data channel is not needed and thereby occurs a radio resource that is not used as the downlink control channel among the radio resources allocated to the downlink control channels. Otherwise, the scheduler 111 judges that transmission of data through the downlink control channel is needed.

The scheduler 111, upon judging that transmission of data through the downlink control channel is needed in step A1, transmits the control signal s111a to the downlink-control-channel creation section 112. The downlink-control-channel creation section 112 creates signaling information of the downlink data channel based on the control signal s111a (step A2). The scheduler 111 also delivers, to the signal selection section 114, the control signal s111b that indicates selection of the downlink-control-channel creation section 112. The signal selection section 114 selects the output signal s112 from the downlink-control-channel creation section 112 based on the instruction by the control signal s111b (step A3).

The CRC calculation section 115 adds CRC to the output signal s112 of the downlink-control-channel creation section 112 delivered from the signal selection section 114 (step A4). The downlink-control-channel coding section 117 performs error correction coding with respect to signal s115 that is added by CRC and output from the CRC calculation section 115 (step A5). The scheduler 111 delivers the control signal s111e to the amplitude multiplication section 118, and sets a normal amplitude as the amplitude used for multiplication in the amplitude multiplication section 118. The amplitude multiplication section 118 multiplies the downlink-control-channel signal s117 output from the downlink-control-channel coding section 117 by the amplitude thus set, to output a downlink control signal s118 (step A6).

The modulation section 119 modulates the downlink control signal s118, output from the amplitude multiplication section 118, based on the control signal s111e output from the scheduler 111, to thereby create a transmission signal (step A7). The radio section 102 converts the output data s119 from the modulation section 119 into an RF-band signal, and performs radio transmission of the thus converted signal through the antenna 101 (step A8).

The scheduler 111, upon judging that transmission of data through the downlink control channel is not needed in step A1, delivers to the signal selection section 114 the control signal s111b that indicates selection of the dummy-pattern creation section 113. The signal selection section 114 selects the downlink-control dummy-pattern signal s113 output from the downlink-control dummy-pattern creation section 113, based on instruction by the control signal s111b (step A9). The CRC calculation section 115 adds CRC to the downlink-control dummy-pattern signal s113 output from the signal selection section 114 (step A10). The downlink-control-channel coding section 117 performs error correction coding with respect to the downlink-control dummy-pattern signal s113 to which the CRC is added (step A11).

The scheduler 111 delivers the control signal s111e to the amplitude multiplication section 118, and sets a smaller amplitude smaller than the normal amplitude for the control information as the amplitude used for multiplication in the amplitude multiplication section 118. This amplitude corresponds to the power level of the downlink control channel that suppresses occurrence of interference with a signal transmitted from another sector or another base station. The amplitude multiplication section 118 multiplies the downlink-control-channel signal s117 by the amplitude thus set (step A12).

The steps subsequent to step A12 are similar to the steps of operation for transmission of data through the downlink control channel. More specifically, the modulation section 119 performs modulation in step A7, and the radio section 102 performs radio transmission of the RF signal corresponding to the downlink-control dummy-pattern signal s113 in step A8. The transmission power of the radio signal transmitted in step A12 upon transmission of no control information through the downlink control channel is smaller than the transmission power upon transmission of control information through the downlink control channel because the amplitude used for multiplication in step A12 is smaller than the amplitude used for multiplication in step A6 in the amplitude multiplication. The lower transmission power level can suppress interference with the signal transmitted from another sector or another base station.

Figure 4:
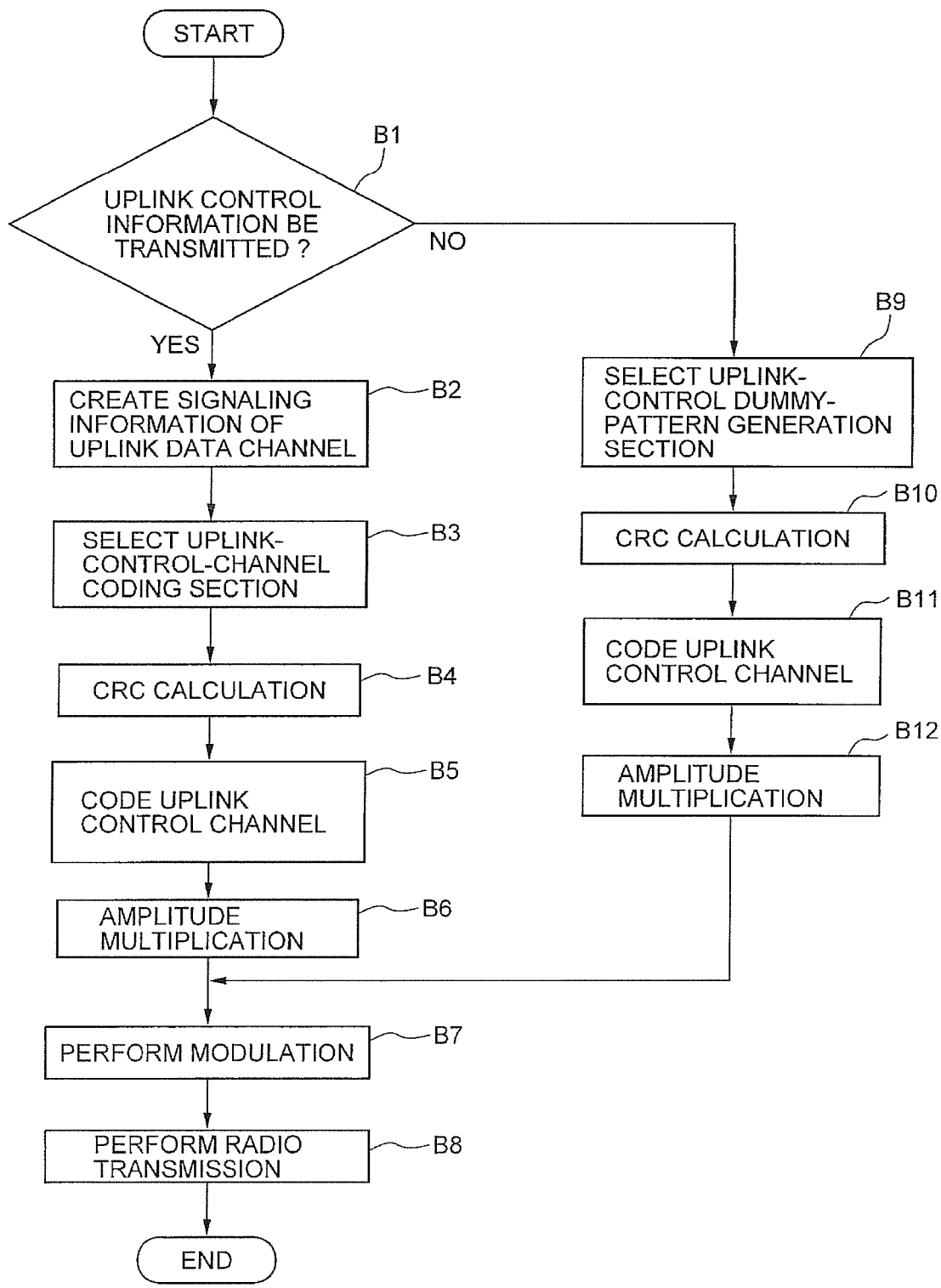
FIG. 4 is a flowchart showing the procedure of transmission of control information through the uplink control channel in the base station.

FIG. 4 shows the procedure of operation in the base station 100 during transmission of data through the uplink control channel. The scheduler 111 judges whether or not the uplink control channel is to be used for transmission of control information (step B1). The scheduler 111 judges that transmission of control information through a specific uplink-control-channel is not needed, if there occurs a mobile station for which transmission of data through the corresponding uplink data channel is not needed and thereby occurs a radio resource that is not used for the uplink control channel among the radio resources allocated to the uplink control channels. Otherwise, the scheduler 111 judges that transmission of data through the uplink control channel is needed.

The scheduler 111, upon judging that transmission of data through the uplink control channel is needed in step B1, transmits the control signal s111c to the uplink-control-channel creation section 122. The uplink-control-channel creation section 122 creates signaling information of the uplink data channel based on the control signal s111c (step B2). The scheduler 111 also delivers, to the signal selection section 124, the control signal s111d that indicates selection of the uplink-control-channel creation section 122. The signal selection section 124 selects the output signal s122 from the uplink-control-channel creation section 122 based on instruction by the control signal s111d (step B3).

The CRC calculation section 125 adds CRC to the output signal s122 of the uplink-control-channel creation section 122 delivered from the signal selection section 124 (step B4). The uplink-control-channel coding section 127 performs error correction coding with respect to signal s125 that is added by CRC and output from the CRC calculation section 125 (step B5). The scheduler 111 delivers the control signal s111e to the amplitude multiplication section 128, and sets a normal amplitude for the control information as the amplitude used for multiplication in the amplitude multiplication section 128. The amplitude multiplication section 128 multiplies the uplink-control-channel signal s127 output from the uplink-control-channel coding section 127 by the amplitude thus set to deliver an uplink-control signal s128 (step B6).

The modulation section 119 modulates the uplink-control signal s128, output from the amplitude multiplication section 128, based on the control signal s111e output from the scheduler 111, to thereby generate a transmission signal (step B7). The radio section 102 converts the output data s119 from the modulation section 119 into an RF-band signal, and performs radio transmission of the thus converted signal through the antenna 101 (step B8).

The scheduler 111, upon judging that transmission of data through the uplink control channel is not needed in step B1, delivers to the signal selection section 124 the control signal s111d that indicates selection of the dummy-pattern creation section 123. The signal selection section 124 selects the uplink-control dummy-pattern signal s123 output from the uplink-control dummy-pattern creation section 123, based on instruction by the control signal s111b (step B9). The CRC calculation section 125 adds CRC to the uplink-control dummy-pattern signal s123 output from the signal selection section 124 (step B10). The uplink-control-channel coding section 127 performs error correction coding with respect to the uplink-control dummy-pattern signal s123 to which the CRC is added (step B11).

The scheduler 111 delivers the control signal s111e to the amplitude multiplication section 128, and sets a smaller amplitude smaller than the normal amplitude for the control information as the amplitude used for multiplication in the amplitude multiplication section 128. This amplitude preferably corresponds to the power level of the uplink control channel that suppresses interference with a signal transmitted from another sector or another base station. The amplitude multiplication section 128 multiplies the uplink-control-channel signal s127 by the amplitude thus set (step B12).

The steps subsequent to step B12 are similar to the steps of operation for transmission of data through the uplink control channel. More specifically, the modulation section 119 performs modulation in step B7, and the radio section 102 performs radio transmission of the RF signal corresponding to the uplink-control dummy-pattern signal s123 in step B8. The transmission power of the radio signal transmitted in step B12 upon transmission of the dummy pattern is smaller than the transmission power upon transmission of the control information through the uplink control channel because the amplitude used for multiplication in step B12 is smaller than the amplitude used for multiplication in step B6 in the amplitude multiplication. The lower transmission power can suppress interference with the signal transmitted from another sector or another base station.

The amplitude used for multiplication in steps A12 and B12 is preferably set within a suitable range. An excessively larger amplitude incurs interference with the control signal transmitted from another sector or another base station. On the other hand, an excessively smaller amplitude incurs a substantial DTX of the downlink or uplink control channel. A preferable upper limit of the amplitude used for multiplication in steps A12 and B12 is a power level around 6 dB reduced from the transmission power of another base station, corresponding to half the transmission power thereof. A preferable lower limit of the amplitude is a power level 30 to 40 dB reduced from the transmission power of another base station, for example, that is significantly larger than the minimum receiving sensitivity of the mobile station.

Figure 5:
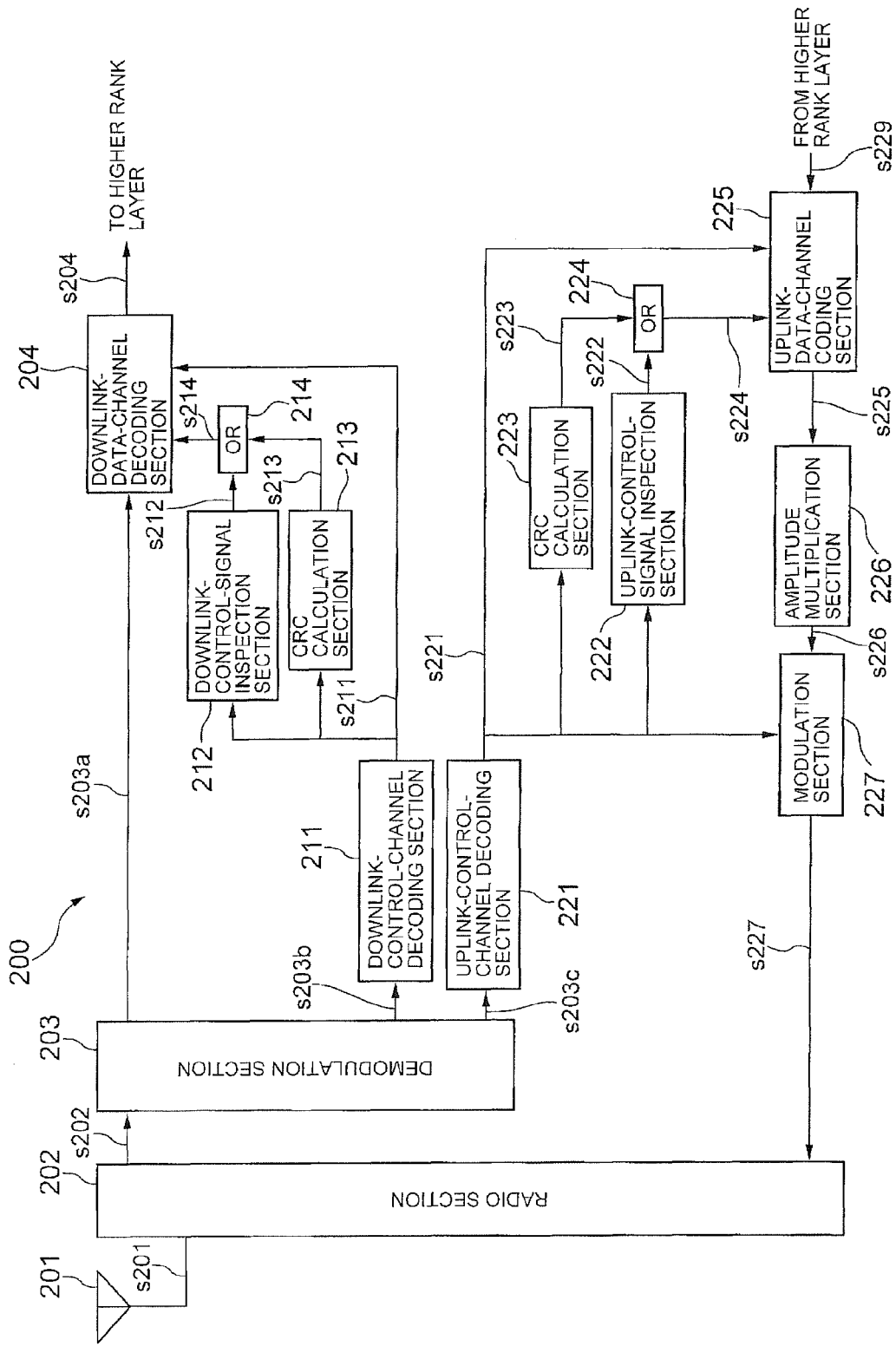
FIG. 5 is a block diagram showing the configuration of the mobile station shown in FIG. 1.

The configuration of the mobile station 200 will be described next with reference of FIG. 5. The mobile station 200 performs radio transmission/reception between the same and the base station 100 shown in FIG. 2. The mobile station 200 includes an antenna 201, a radio section 202, a demodulation section 203, a downlink-data-channel decoding section 204, a downlink-control-channel decoding section 211, a downlink-control-signal inspection section 212, a CRC calculation section 213, an OR gate 214, an uplink-control-channel decoding section 221, an uplink-control-signal inspection section 222, a CRC calculation section 223, an OR gate 224, an uplink-data-channel coding section 225, an amplitude multiplication section 226, and a modulation section 227.

The antenna 201, radio section 202, demodulation section 203, and modulation section 227 are similar to the antenna 101, radio section 102, demodulation section 103, and modulation section 119, respectively, shown in FIG. 2. The demodulation section 203 calculates a soft-decision value s203a based on the baseband signal s202 obtained from the received signal s201, and delivers the soft-decision value s203a to the downlink-data-channel decoding section 204. The demodulation section 203 delivers the downlink-control-channel signal s203b and uplink-control-channel signal s203c to the downlink-control-channel decoding section 211 and uplink-control-channel decoding section 221, respectively.

The downlink-control-channel decoding section 211 performs error correction decoding with respect to the downlink-control-channel signal s203b. The downlink-control-channel decoding section 211 delivers the error-correction decoded result s211 to the downlink-data-channel decoding section 204, downlink-control-signal inspection section 212 and CRC calculation section 213.

The downlink-control-signal inspection section 212 examines whether or not the control information shown by the error-correction decoded result s211 is within a suitable range. More specifically, the downlink-control-signal inspection section 212 examines whether or not the error-correction decoded result s211 is data that is suitably used in the downlink-data-channel decoding section 204. The downlink-control-signal inspection section 212 analyzes the information for decoding the downlink-data-channel, such as resource-block allocation information for each mobile station, HARQ process number, retransmission sequence number, etc. in the error-correction decoded result s211. The downlink-control-signal inspection section 212 delivers the inspection result s212 as to whether or not the error-correction decoded result s211 shows that the data is to be used in the downlink-data-channel decoding section 204, i.e., the error correction result is OK or NG, depending on the inspection result s212.

The downlink-control-signal inspection section 212 examines whether or not the error-correction decoded result s211 includes a bit pattern showing that the radio resource is not allocated for transmission of the control information, for example. Whether or not the radio resource is allocated can be judged by judging whether or not the error-correction decoded result s211 includes a value corresponding to the dummy-pattern signal s113 (FIG. 2). The downlink-control-signal inspection section 212 also examines whether or not the value for each piece of information is within the range that is suitable as the range of value of information that the base station 100 transmits. The downlink-control-signal inspection section 212 outputs "OK" as the inspection result s212 when there occurs a radio resource allocation and the value of each piece of control information is within the suitable range, and otherwise outputs "NG" as the inspection result s212. The downlink-control-signal inspection section 212 may output "NG" if the transmission power of the specific dummy pattern for the control information is lower than the normal transmission power for the control information.

The CRC calculation section 213 is configured as an error detection section that performs error detection of the downlink control channel by using the error detecting code added in the transmitting side. The CRC calculation section 213 calculates a CRC remainder with respect to the error-correction decoded result s211 output from the downlink-control-channel decoding section 211, and delivers a CRC calculation result. The CRC calculation section 213 delivers a CRC calculation result s213 that shows the CRC result is "OK" if the error-correction decoded result s211 is divisible by the CRC-generating polynomial. The CRC calculation section 213 outputs a CRC calculation result s213 that represents CRC=NG, if the error-correction decoded result s211 is not divisible by the CRC-generating polynomial.

OR gate 214 calculates a logical sum of the inspection result s212 output from the downlink-control-signal inspection section 212 and the CRC calculation result s213 obtained by the CRC calculation section 213, to output the logical sum s214 to the downlink-data-channel decoding section 204. OR gate 214 outputs "0" as the logical sum s214, for example, if the inspection result s212 is "OK" and the CRC calculation result s213 is CRC=OK. OR gate 214 outputs "1" as the logical sum s214, if at least one of the inspection result s212 and the CRC calculation result s213 is "NG". The value of the logical sum itself depending on "NG" or "OK" may be reversed from the above example, "1" or "0".

The downlink-data-channel decoding section 204 performs error correction decoding of the soft-decision value s203a based on the error-correction decoded result s211 of the downlink control channel, if the logical sum s214 output from OR gate 214 is zero, i.e., if the inspection result s212 is "OK" and the CRC calculation result s213 is "OK". The downlink-data-channel decoding section 204 delivers the error-correction decoded result s204 to the higher rank layer. The downlink-channel-decoding section 204 disregards the error-correction decoded result s211 to stop output of the error-correction decoded result s204, i.e., delivers no signal, if the logical sum s214 is "1", i.e., if the inspection result s212 is "NG" and/or if the CRC calculation result s213 is "NG".

The uplink-control-channel decoding section 221 performs error correction decoding of the uplink-control-channel signal s203c. The uplink-control-channel decoding section 221 outputs the error-correction decoded result s221 to the uplink-control-signal inspection section 222, The CRC calculation section 223, uplink-data-channel coding section 225, and modulation section 227.

The uplink-control-signal inspection section 222 examines whether or not the control information shown by the error-correction decoded result s221 is within a suitable range of value. The uplink-control-signal inspection section 222 analyzes the error-correction decoded result s221 to examine whether or not the error-correction decoded result s221 is to be used in the uplink-data-channel coding section 225. The uplink-control-signal inspection section 222 analyzes the information for coding the uplink data channel, such as the resource-block allocation information of each mobile station, HARQ process number, and retransmission sequence number, for example, in the error-correction decoded result s221. The uplink-control-signal inspection section 222 outputs "OK" as the inspection result s222 that shows the error-correction decoded result s221 is to be used in the uplink-data-channel coding section 225, or outputs "NG" as the inspection result s222 that shows the error-correction decoded result s221 is not to be used in the uplink-data-channel coding section 225.

The uplink-control-signal inspection section 222 examines whether or not the error-correction decoded result s221 includes a bit pattern or bit error sequence representing that the radio resource is not allocated for transmission of the control information. Judgment of whether or not the radio resource is allocated can be performed by judging whether or not the error-correction decoded result s221 includes the value corresponding to the dummy-pattern signal s123 (FIG. 2). The uplink-control-signal inspection section 222 also inspects whether or not the value of each piece of information is within a suitable range that the base station 100 transmits as the value of each piece of information. The uplink-control-signal inspection section 222 outputs "OK" as the inspection result s222, if there is radio-resource allocation information and each piece of control is within the suitable range. The uplink-control-signal inspection section 222 otherwise outputs "NG" as the inspection result s222.

The CRC calculation section 223 is configured as an error detection section that performs error detection of the uplink control channel by using the error detecting code added in the transmitting side. The CRC calculation section 223 calculates a CRC remainder with respect to the error-correction decoded result s221 output from the uplink-control-channel decoding section 221, and outputs a CRC calculation result. The CRC calculation section 223 delivers a CRC calculation result s223 that represents CRC=OK if the error-correction decoded result s221 is divisible by the CRC-generating polynomial. The CRC calculation section 223 outputs CRC calculation result s223 that represents CRC=NG if the error-correction decoded result s221 is not divisible by the CRC-generating polynomial.

OR gate 224 calculates a logical sum of the inspection result s222 output from the uplink-control-signal inspection section 222 and the CRC calculation result s223 output from the CRC calculation section 223, to output the logical sums 224 to the uplink-data-channel coding section 225. OR gate 224 outputs "0" as the logical sum s224, for example, if the inspection result s222 is "OK", and the CRC calculation result s223 is "OK". OR gate 224 outputs "1" as the logical sum s224 if at least one of the inspection result s222 and the CRC calculation result s223 is "NG". The logical sum s224 representing "NG" or "OK" itself may be reversed from "1" or "0".

The uplink-data-channel coding section 225 performs error correction coding of the uplink data channel s229 delivered from the higher rank layer based on the error-correction decoded result of the uplink control channel, if the logical sum s224 output from OR gate 224 is "0", i.e., if the inspection result s222 is "OK" and the CRC calculation result s223 is "OK". The uplink-data-channel coding section 225 outputs the error correction coding result s225 to the amplitude multiplication section 226. The uplink-data-channel coding section 225 disregards the error-correction decoded result s221 of the uplink control channel, stops coding and outputs no signal for error correction coding result, if the logical sum s224 is "1", i.e., if the inspection result s222 is "NG" and/or if the error-correction decoded result s223 is "NG".

The amplitude multiplication section 226 performs multiplication of the error correction coding result s225 by the amplitude, to output a signal s226 to the modulation section 227. The modulation section 227 has the functions of allocating the input signal s226 to the radio resource of the uplink control channel, spreading, modulating, setting a signal of the radio resource band to DFT (discreet Fourier transform), and calculating IFFT (inverse fast Fourier transform) thereof. The signal s227 modulated by the modulation section 227 is transmitted from the radio section 202 toward the base station 100 through the antenna 201.

Figure 6:
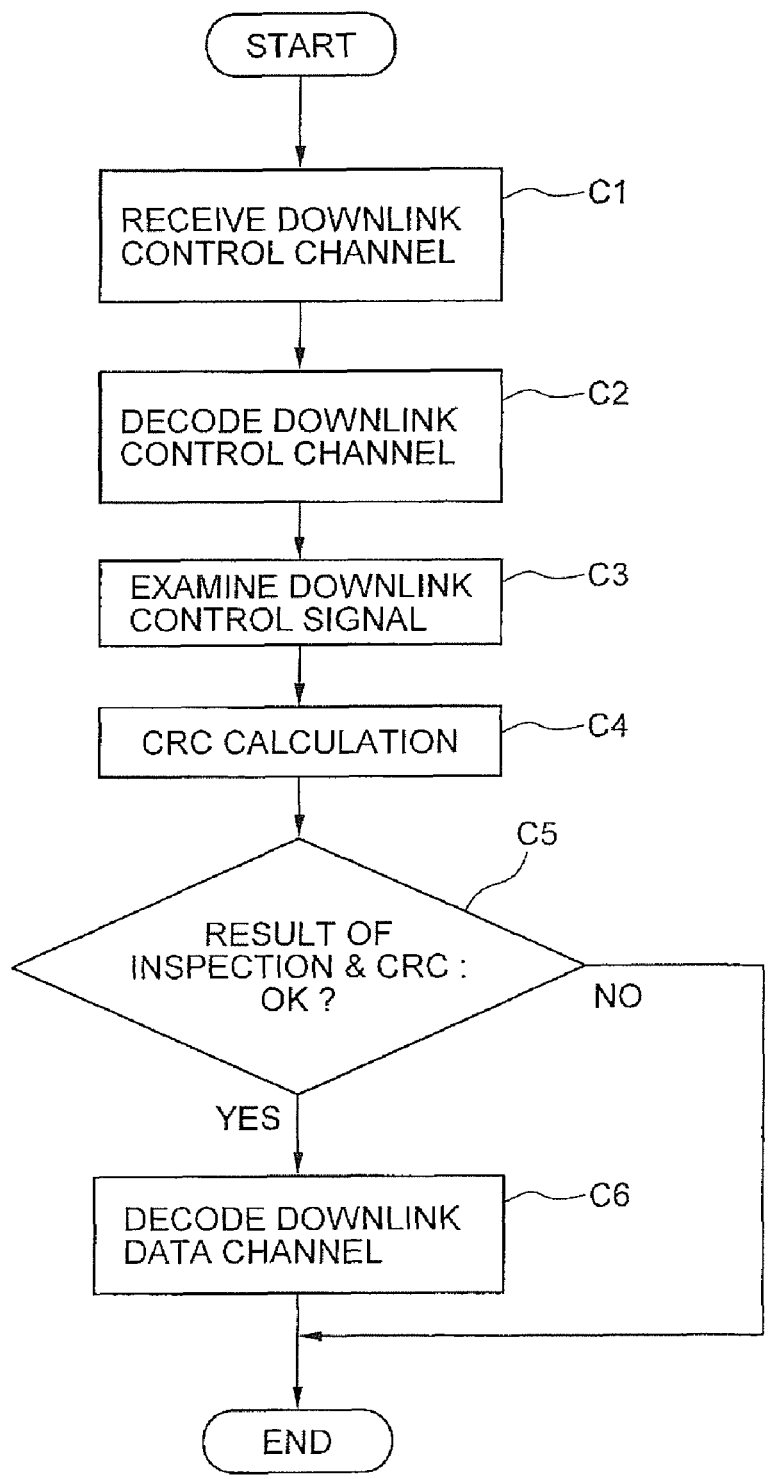
FIG. 6 is a flowchart showing the procedure of reception of control information through the downlink control channel.

FIG. 6 shows the procedure for reception of data through the downlink control channel in the mobile station 200. The radio section 202 receives a radio signal from the base station 100 through the antenna 201 (step C1). The radio section 202 converts the received signal s201 through the antenna 201 into the baseband signal s202. The demodulation section 203 demodulates the downlink-control-channel signal s203b from the baseband signal s202. The downlink-control-channel decoding section 211 performs error correction decoding of the downlink-control-channel signal s203b (step C2).

The downlink-control-signal inspection section 212 examines whether or not the control information represented by the error-correction decoded result s211 is within the suitable range (step C3). The downlink-control-signal inspection section 212 analyzes the error-correction decoded result s211, and judges that the inspection result s212 is "OK" if the number of resource blocks is larger than zero and all the other pieces of control information are within the predetermined suitable range of value, to deliver "0" as the inspection result s212. Otherwise, the downlink-control-signal inspection section 212 delivers "1", i.e., "NG" as the inspection result s212.

The CRC calculation section 213 calculates a CRC remainder with respect to the error-correction decoded result s211 output from the downlink-control-channel decoding section 211, to deliver a CRC calculation result (step C4). The CRC calculation section 213 sets "0" for the CRC calculation result s213 if the error-correction decoded result s211 is divisible by the CRC-generating polynomial. The CRC calculation section 213 sets "1" for the CRC calculation result s213 if the error-correction decoded result s211 is not divisible by the CRC-generating polynomial.

OR gate 214 delivers a logical sum of the inspection result s212 output from the downlink-control-signal inspection section 212 and the CRC calculation result s213 output from the CRC calculation section 213 to the downlink-data-channel decoding section 204. The downlink-data-channel decoding section 204 judges whether or not the logical sum s214 calculated by OR gate 214 is "0", i.e., whether or not both the inspection result s212 and CRC calculation result s213 are "OK" (step C5).

The downlink-data-channel decoding section 204 performs error correction decoding processing of the soft-decision value s203a based on the error-correction decoded result s211 of the downlink control channel based on the error-correction decoded result s221 of the downlink control channel, if the logical sum s214 is "0" (step C6). The downlink-data-channel decoding section 204 stops output of the error-correction decoded result s204, if the logical sum s214 is "1", and terminates the processing thereof.

Figure 7:
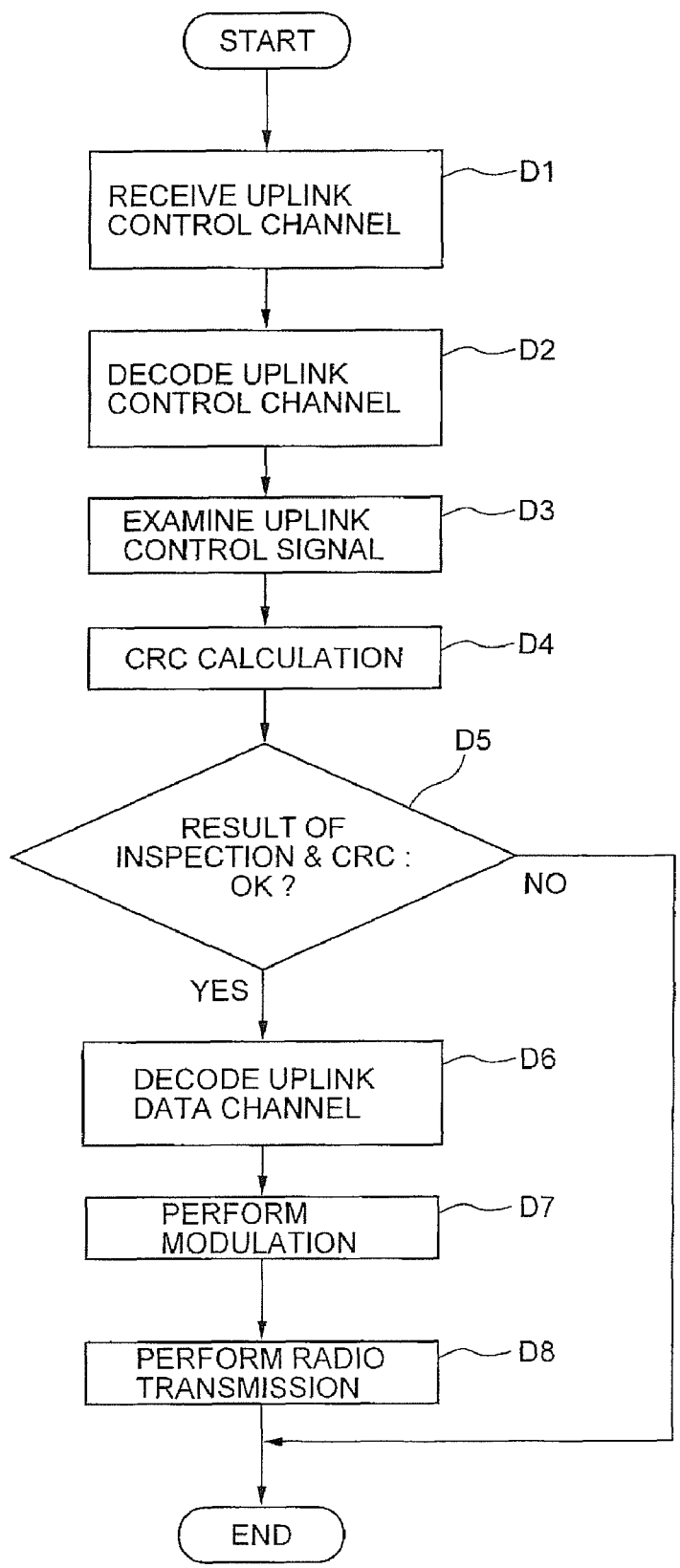
FIG. 7 is a flowchart showing the procedure of reception of control information through the uplink control channel.

FIG. 7 shows the procedure for reception of data through the uplink control channel in the mobile station 200. The radio section 202 receives a radio signal from the base station 100 through the antenna 201 (step D1). The radio section 202 converts the received signal s201 through the antenna 201 into the baseband signal s202. The demodulation section 203 demodulates the uplink-control-channel signal s203c from the baseband signal s202. The uplink-control-channel decoding section 221 performs error correction decoding of the uplink-control-channel signal s203c (step D2).

The uplink-control-signal inspection section 222 examines whether or not the value of control information represented by the error-correction decoded result s221 is within the suitable range (step D3). The uplink-control-signal inspection section 222 analyzes the error-correction decoded result s221, and judges that the inspection result s222 is "OK" if the number of resource blocks is larger than zero and all the other pieces of control information are within the predetermined suitable range of value, and delivers "0" as the inspection result s222. Otherwise, the uplink-control-signal inspection section 222 delivers "1", i.e., "NG" as the inspection result s222.

The CRC calculation section 223 calculates a CRC remainder with respect to the error-correction decoded result s221 output from the uplink-control-channel decoding section 221, to deliver a CRC calculation result (step D4). The CRC calculation section 223 sets "0" for the CRC calculation result s223 if the error-correction decoded result s221 is divisible by the CRC-generating polynomial. The CRC calculation section 213 sets "1" or "NG" for the CRC calculation result s213 if the error-correction decoded result s211 is not divisible by the CRC-generating polynomial.

OR gate 224 delivers a logical sum of the inspection result s222 output from the uplink-control-signal inspection section 222 and the CRC calculation result s223 output from the CRC calculation section 223 to the uplink-data-channel coding section 225. The uplink-data-channel coding section 225 judges whether or not the logical sum s224 calculated by OR gate 224 is "0", i.e., whether or not both the inspection result s212 and the CRC calculation result s213 are "OK" (step D5).

The uplink-data-channel coding section 225 performs error correction coding processing of the uplink data channel s229 based on the error-correction decoded result s221 of the uplink control channel based on the error-correction decoded result s221 of the uplink control channel, if the logical sum s224 is "0" (step D6). The modulation section 227 receives the error-correction coded result s227 through the amplitude multiplication section 226, to perform modulation (step D7). The radio section 202 transmits the modulated signal s227 modulated by the modulation section 227 toward the base station 100 through the antenna 201 (step D8).

The uplink-data-channel coding section 225 disregards the error-correction decoded result s221 of the uplink control channel, stops coding, and output no signal for the error-correction coded result s225, if the logical sum s224 is "1". In this case, transmission of the uplink data channel is not performed.

In the present exemplary embodiment, the base station 100 transmits, to the mobile station 200, the signal obtained by adding the error detection code to the dummy pattern at a power level lower than the normal transmission power of the control information, if there occurs a radio resource that is not used for transmission of control information to the mobile station among the radio resources allocated to the uplink or downlink control channels. In addition, the base station 100 transmits a signal having a significant amplitude (i.e., significant power level) through the radio resource that does not transmit control information through the downlink or uplink control channel, without setting the control channel to DTX. This prevents the data transmitted through the control channel from assuming a random value even if the downlink or uplink control signal does not transmit the control information, whereby the decoded result in those mobile stations 200 is generally CRC=OK.

If the control channel is set to DTX to the contrary, the decoded result thereof has insignificant information, thereby providing CRC=NG without a problem in most cases. However, there is some minor possibility that a case occurs wherein the decoded result is divisible by the CRC-generating polynomial, to thereby provide the problem of CRC=OK. In the present embodiment, since the control channel signal which is not needed in fact for transmission is transmitted from the base station 100 at a significant amplitude, the control channel signal transmitted from the base station 100 can be correctly decoded in the mobile station 200. Thus, the present embodiment solves the problem that CRC=OK is erroneously detected in the mobile station in the case of DTX of the control channel. In addition, since the base station 100 transmits such a control channel signal at a power level lower than the normal transmission power for the control information, interference with the signal transmitted from another sector or another base station can be prevented.

In the above embodiment, the mobile station 200 decodes the downlink or uplink control channel, and examines whether or not the control information obtained as the decoded result is within the suitable range of value. In addition, the mobile station 200 performs error detection processing of the decoded result by using the CRC added in the base station 100. The mobile station 200 does not perform decoding in the downlink-data-channel decoding section 204 or coding in the uplink-data-channel coding section 225, if each piece of the control information is not within the suitable range, i.e. if CRC=NG. The base station 100 intentionally employs the configuration wherein the control information represented by the dummy pattern is out of the suitable range of value, thereby expressly indicating the mobile station 200 that the control information represented by the dummy pattern be not used for the decoding or coding in the mobile station 200.

As described above, even if CRC=OK, the mobile station 200 does not perform decoding or coding so long as the control information represented by the decoded result of the downlink or uplink control channel is out of the suitable range of value. This prevents the mobile station 200 from erroneous decoding of the downlink data channel that may be caused by the erroneous decoded result of the downlink control channel. Thus, it is possible to prevent occurring of a vast number of bit errors in the downlink data channel that may be caused by decoding the received signal by using an erroneous decoding parameter. As to the uplink control channel, it is also possible to prevent the mobile station 200 from transmitting an unnecessary data that may be obtained by erroneous coding of the own data to be transmitted through the uplink control channel.

Figure 8:
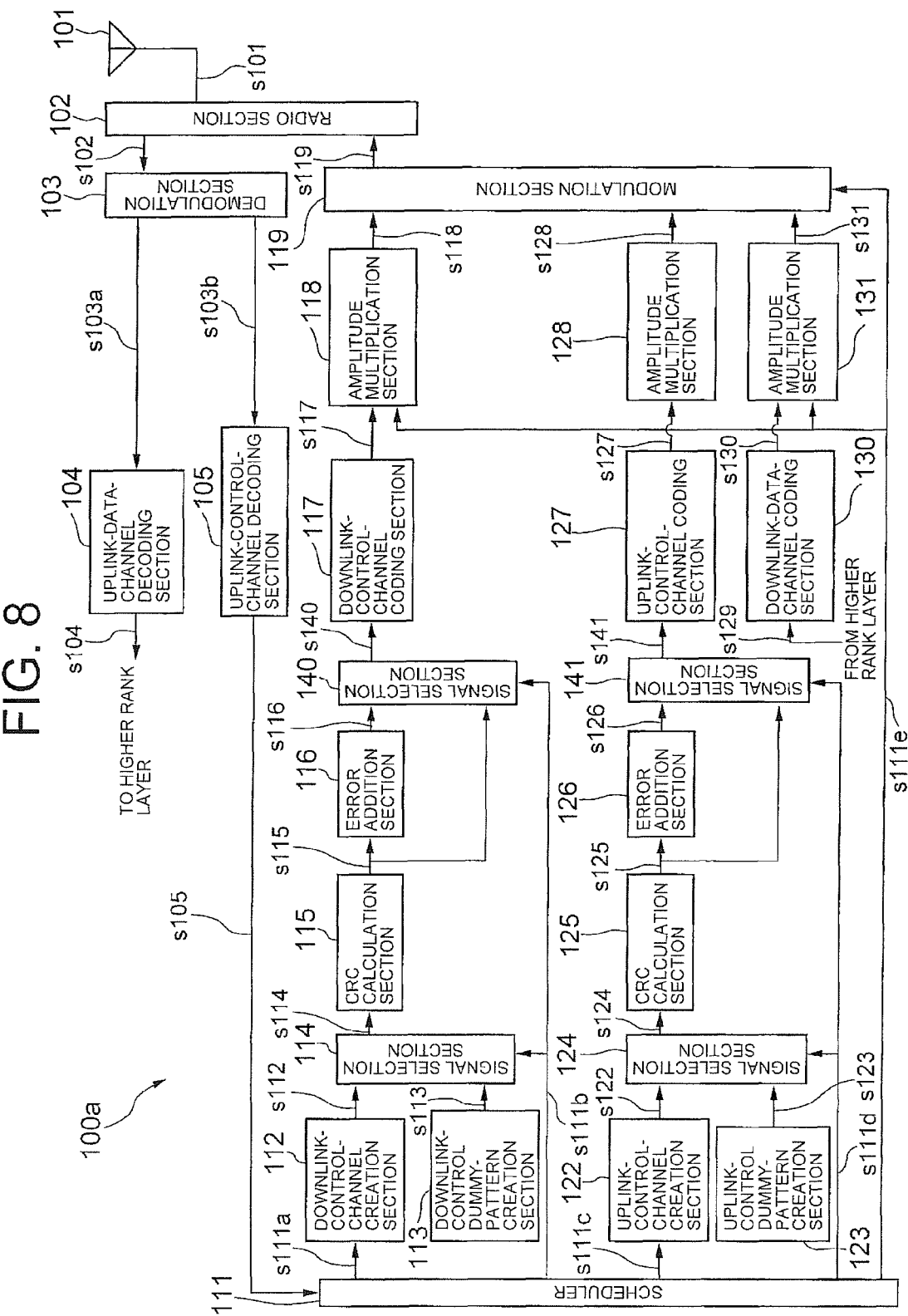
FIG. 8 is a block diagram showing the base station in a radio communication system according to a second embodiment of the present invention.

A radio communication system according to a second exemplary embodiment of the present invention will be described with reference to FIG. 8. FIG. 8 shows the base station in the radio communication system of the second embodiment. The base station 100a shown in FIG. 8 includes, in addition to the configuration of the base station 100 shown in FIG. 2, an error addition section 116 and a signal selection section 140 on the output node of the CRC calculation section 115, and an error addition section 126 and a signal selection section 141 on the output node of the CRC calculation section 125. The other configuration and operation thereof are similar to those in FIG. 2. The CRC calculation section 115 and error addition section 116 as well as the CRC calculation section 125 and error addition section 126 configure an error-detection coding section.

The error addition section 116 adds an error bit sequence to the signal s115 that is obtained by adding CRC to the output signal s114 of the signal selection section 114 in the CRC calculation section 115. The error bit sequence added by the error addition section 116 has a value that is not a multiple of the CRC-generating polynomial, whereby the decoded result of the bit error sequence is judged to have an error. The signal selection section 140 selects either a signal s115 that is added with CRC by the CRC calculation section 115 or a signal s116 added with the error bit sequence by the error addition section 116, in accordance with the control signal s111b output from the scheduler 111, and delivers the selected signal s140 to the downlink-control-channel coding section 117. The signal selection section 140 outputs the signal s115 that is added with CRC by the CRC calculation section 115 if the signal selection section 114 selects the output signal s112 from the downlink-control-channel creation section 112, and outputs the signal s116 that is added with the error bit sequence by the error addition section 116 if the signal selection section 114 selects the downlink-control dummy-pattern signal s113.

The error addition section 126 adds an error bit sequence to the signal s125 that is obtained by adding CRC to the output signal s124 of the signal selection section 124 in the CRC calculation section 125. The error bit sequence added by the error addition section 126 has a value that is not a multiple of the CRC-generating polynomial, whereby the decoded result of the bit error sequence is judged to have an error. The signal selection section 141 selects the signal s125 that is added with CRC by the CRC calculation section 125 or the signal s126 added with the error bit sequence by the error addition section 126 in accordance with the control signal s111d output from the scheduler 111, and delivers the selected signal s141 to the uplink-control-channel coding section 127. The signal selection section 141 outputs signal s125 that is added with CRC by the CRC calculation section 125 if the signal selection section 124 selects the output signal s122 from the uplink-control-channel creation section 122, and outputs the signal s126 that is added with the error bit sequence by the error addition section 126 if the signal selection section 124 selects the uplink-control dummy-pattern signal s123.

Figure 9:
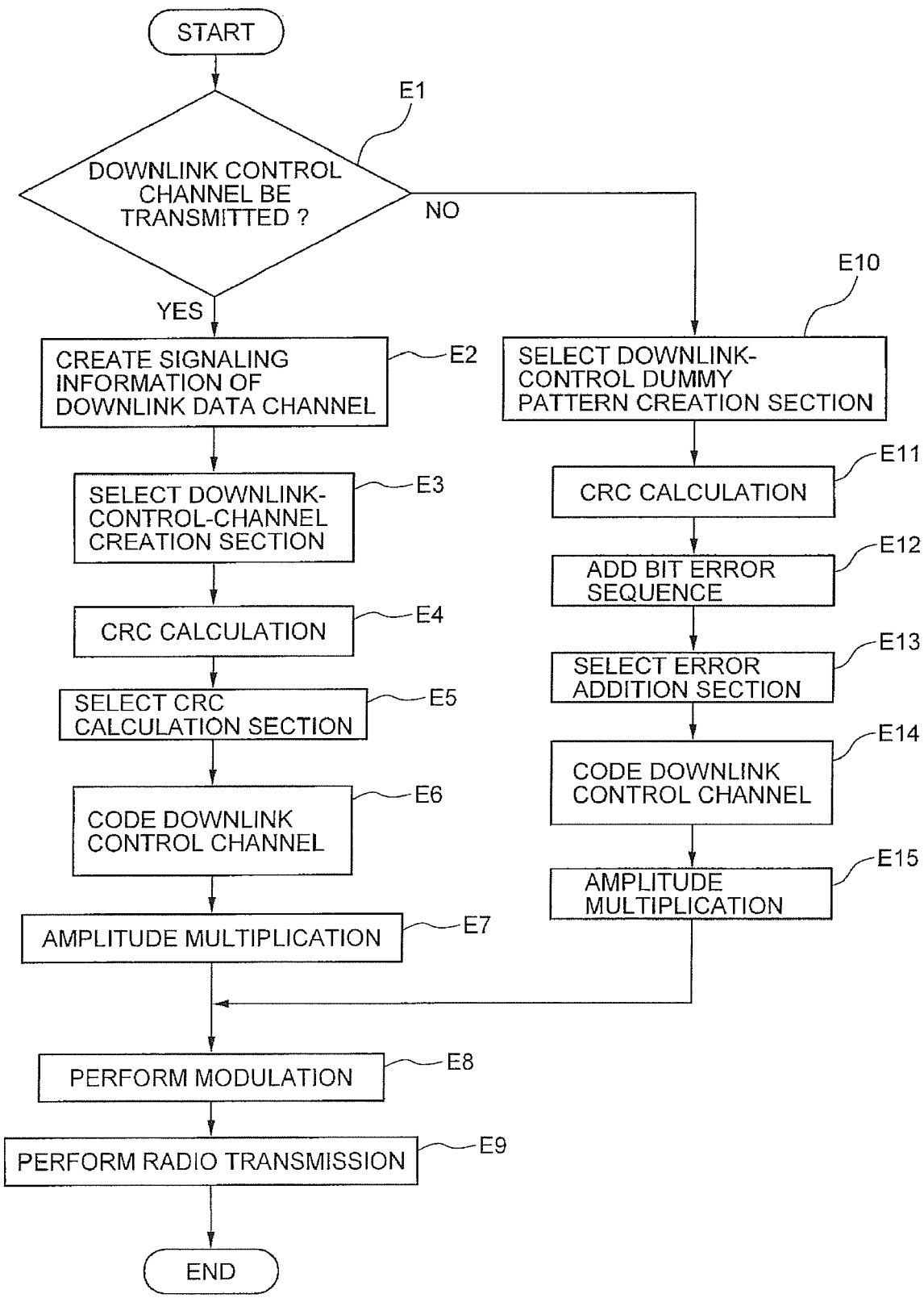
FIG. 9 is a flowchart showing the procedure of transmission of control information through the downlink control channel in the base station of the second embodiment.

FIG. 9 shows the procedure for transmission of data through the downlink-control-channel in the base station 100a. The scheduler 111 judges whether or not data is to be transmitted through the downlink control channel (step E1). The scheduler 111 judges that transmission of data through the downlink control channel is not needed if there occurs a mobile station for which transmission of data through the downlink data channel is not needed and thus a radio resource that is not used for transmission of data through the downlink control channel occurs among the radio resources allocated to the downlink control channels. Otherwise, the scheduler 111 judges that transmission of data through the downlink control channel is needed.

The scheduler 111, upon judging in step E1 that data is to be transmitted through the downlink control channel, transmits the control signal s111a to the downlink-control-channel creation section 112. The downlink-control-channel creation section 112 creates signaling information of the downlink data channel based on the control signal s111a (step E2). The scheduler 111 transmits to the signal selection section 114 the control signal s111b that indicates selection of the downlink-control-channel creation section 112. The signal selection section 114 selects the output signal s112 from the downlink-control-channel creation section 112 based on the control signal s111b (step E3).

The CRC calculation section 115 adds CRC to the output signal s112 of the downlink-control-channel creation section 112 output through the signal selection section 114 (step E4). The scheduler 111 transmits to the signal selection section 140 the control signal s111b that indicates selection of the CRC calculation section 115. The signal selection section 140 selects the signal s115 that is added with CRC and output from the CRC calculation section 115 (step E5).

The downlink-control-channel coding section 117 performs error correction coding with respect to the signal s115 that is added with CRC (step E6). The scheduler 111 transmits the control signal s111e to the amplitude multiplication section 118, and sets a normal amplitude for the control information as the amplitude used for multiplication in the amplitude multiplication section 118. The amplitude multiplication section 118 performs multiplication of the downlink-control-channel signal s117 output from the downlink-control-channel coding section 117 by the amplitude (step E7).

The modulation section 119 modulates the downlink control signal s118 output from the amplitude multiplication section 118 based on the control signal s111e output from the scheduler 111, to generate a transmission signal (step E8). The radio section 102 converts the output data s119 from the modulation section 119 into an RF-band signal, and performs radio transmission of the thus converted signal through the antenna 101 (step E9).

The scheduler 111, upon judging in step E1 that data is not to be transmitted through the downlink control channel, transmits to the signal selection section 114 the control signal s111b that indicates selection of the downlink-control dummy-pattern creation section 113. The signal selection section 114 selects the downlink-control dummy-pattern signal s113 output from the downlink-control dummy-pattern creation section 113 in accordance with the control signal s111b (step E10).

The CRC calculation section 115 adds CRC to the downlink-control dummy-pattern signal s113 output from the signal selection section 114 (step E11). The error addition section 116 adds an error bit sequence to the dummy-pattern signal s115 that is added with CRC and output from the CRC calculation section 115 (step E12). The scheduler 111 transmits to the signal selection section 140 the control signal s111b that indicates selection of the error addition section 116. The signal selection section 140 selects a signal s116 that is added with the bit error sequence in the error addition section 116 (step E13). The downlink-control-channel coding section 117 performs error correction coding to the signal s116 that is added with the error sequence (step E14).

The scheduler 111 transmits the control signal s111e to the amplitude multiplication section 118, and set a smaller amplitude that is smaller than the normal amplitude as the amplitude used for multiplication in the amplitude multiplication section 118. The amplitude thus set is preferably a limited amplitude that allows the transmission power of the downlink control channel to suppress interference with a signal transmitted from another sector or another base station. The amplitude multiplication section 118 multiplies downlink-control-channel signal s117 by the amplitude thus set (step E15).

The steps subsequent to step E15 are similar to those in the procedure for transmission of data through the downlink control channel. More specifically, the modulation section 119 performs modulation in step E8, and the radio section 102 performs radio transmission of the RF signal corresponding to the downlink-control dummy-pattern signal s113 in step E9. Since the amplitude used for multiplication in the amplitude multiplication section 118 in step E15 is smaller than the amplitude used for multiplication in step E7, the transmission power of the radio signal transmitted in step E8 without transmission of control information through the downlink control channel is lower than the normal power of transmission of control information through the downlink control channel. The lower transmission power suppresses interference with a signal transmitted from another sector or another base station.

Figure 10:
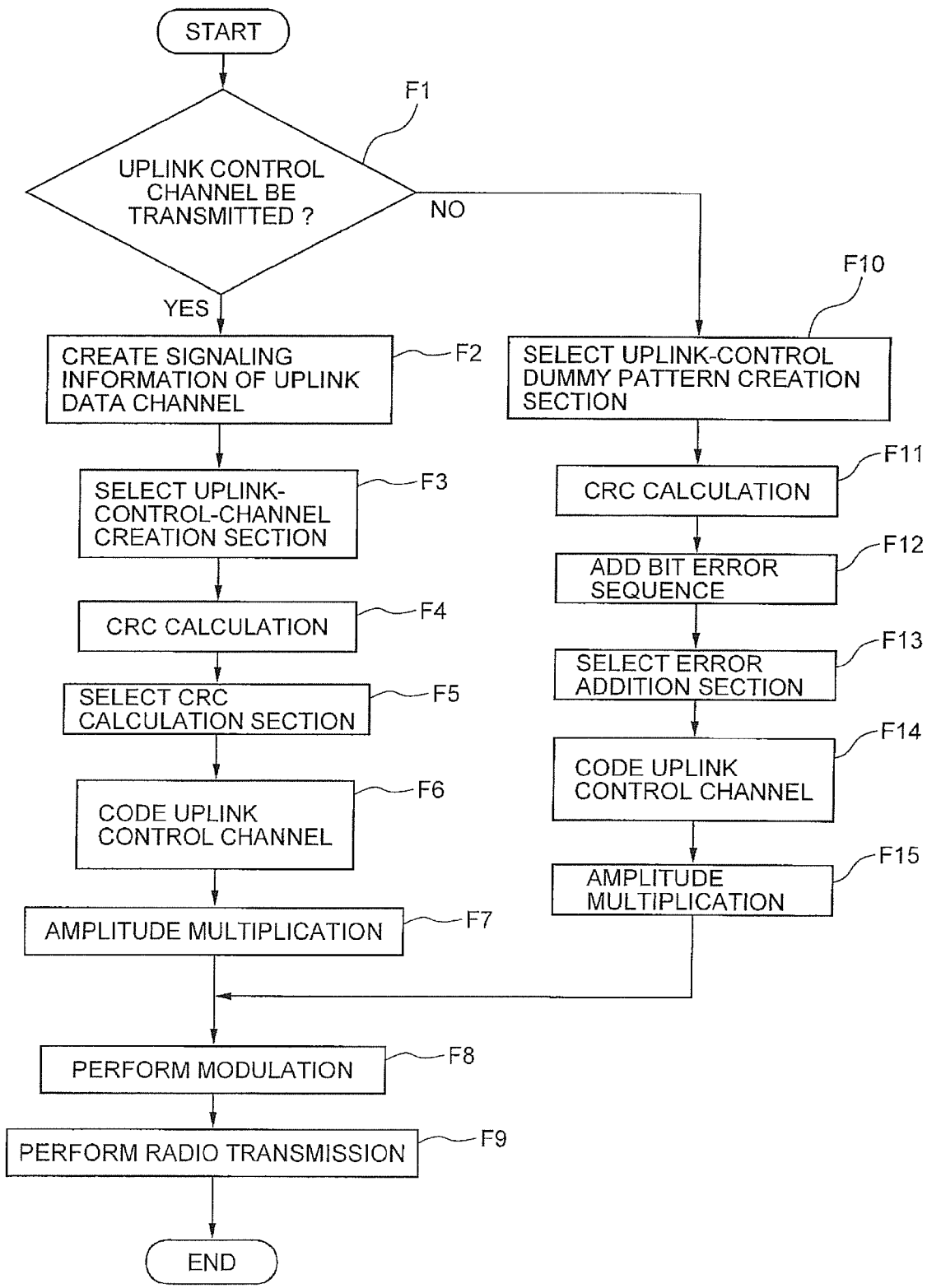
FIG. 10 is a flowchart showing the procedure of reception of control information through the uplink control channel in the mobile station of the second embodiment.

FIG. 10 shows the procedure for transmission of data through the uplink control channel in the base station 100a. The scheduler 111 judges whether or not transmission of data through the uplink control channel is needed (step F1). The scheduler 111 judges that transmission of data through the uplink control channel is not needed, if there occurs a mobile station for which transmission of data is not needed and there occurs a radio resource that is not used for transmission of data through the uplink control channel among the radio resources allocated to the uplink control channels. Otherwise, the scheduler 111 judges that transmission of data through the uplink control channel is needed.

The scheduler 111, upon judging in step F1 that transmission of data through the uplink control channel is needed, transmits the control signal s111c to the uplink-control-channel creation section 122. The uplink-control-channel creation section 122 creates signaling information of the uplink data channel based on the control signal s111c (step F2). The scheduler 111 transmits to the signal selection section 124 the control signal s111d that indicates selection of the uplink-control-channel creation section 122. The signal selection section 124 selects the output signal s122 from the uplink-control-channel creation section 122 in accordance with the control signal s111d (step F3).

The CRC calculation section 125 adds CRC to the output signal s122 of the uplink-control-channel creation section 122 that is delivered from the signal selection section 124 outputs (step F4). The scheduler 111 transmits to the signal selection section 141 the control signal s111d that indicates selection of the CRC calculation section 125. The signal selection section 141 selects the signal s125 that is added with CRC and output from the CRC calculation section 125 (step F5).

The uplink-control-channel coding section 127 performs error correction coding with respect to the signal s125 added with CRC (step F6). The scheduler 111 transmits the control signal s111e to the amplitude multiplication section 128, and set a normal amplitude of the control information as the amplitude used for multiplication in the amplitude multiplication section 128. The amplitude multiplication section 128 performs multiplication of the uplink-control-channel signal s127 output from the uplink-control-channel coding section 127 by the normal amplitude (step F7).

The modulation section 119 modulates the uplink-control signal s128 output from the amplitude multiplication section 128 based on the control signal s111e output from the scheduler 111, to generate a transmission signal (step F8). The radio section 102 converts the output data s119 from the modulation section 119 into an RF-band signal, and performs radio transmission of the thus converted signal through the antenna 101 (step F9).

The scheduler 111, upon judging in step F1 that transmission of data through the uplink control channel is not needed, transmits to the signal selection section 124 the control signal s111d that indicates selection of the uplink-control dummy-pattern creation section 123. The signal selection section 124 selects the uplink-control dummy-pattern signal s123 output from the uplink-control dummy-pattern creation section 123 in accordance with the control signal s111d (step F10).

The CRC calculation section 125 adds CRC to the uplink-control dummy-pattern signal s123 output from the signal selection section 124 (step F11). The error addition section 126 adds an error bit sequence to the dummy-pattern signal s125 that is added with CRC and output from the CRC calculation section 125 (step F12). The scheduler 111 transmits to the signal selection section 141 the control signal s111d that indicates selection of the error addition section 126. The signal selection section 141 selects signal s126 added with the error bit sequence in the error addition section 126 (step F13). The uplink-control-channel coding section 127 performs error correction coding with respect to the signal s126 added with the error bit sequence (step F14).

The scheduler 111 transmits the control signal s111e to the amplitude multiplication section 128, and sets an amplitude smaller than the normal amplitude as the amplitude used for multiplication in the amplitude multiplication section 128. The thus set amplitude is preferably a reduced amplitude corresponding to a power level that can suppress interference with a signal transmitted from another sector or another base station. The amplitude multiplication section 128 performs multiplication of the uplink-control-channel signal s127 by the set amplitude to output an uplink control signal s128 (step F15).

The steps subsequent to step F15 are similar to those in the procedure for transmission of data through the uplink control channel. More specifically, the modulation section 119 performs modulation in step F8, and the radio section 102 performs radio transmission of the RF signal corresponding to the uplink-control dummy-pattern signal s123 in step F9. Since the amplitude used in the amplitude multiplication section 128 in step F15 is smaller than the amplitude used in the multiplication in step F7, the transmission power of the signal without transmission of control data through the uplink control channel in step F8 is lower than the normal power of transmission of the control data through the uplink control channel. The lower transmission power prevents interference with a signal transmitted from another sector or another base station.

The configuration and operation of the mobile station 200 are similar to those in the first embodiment. Since the base station 100 intentionally adds the error bit sequence in the case of absence of data to be transmitted through the downlink or uplink control channel, the result of CRC in the CRC calculation section 213 or 223 is CRC=NG in the mobile station 200. Therefore, the mobile station 200 performs neither decoding in the data-channel decoding section 204, nor coding in the uplink-data-channel coding section 225, if there is no transmission of control information through the downlink or uplink control channel. This prevents occurring of the decoded error of the downlink data channel and unnecessary transmission of data through the uplink data channel.

The mobile station 200 does not perform decoding of the downlink data channel in the downlink-data-channel decoding section 204, if the result of CRC calculation in the CRC calculation section 213 (FIG. 5) is CRC=NG. Thus, the result of inspection in the downlink-control-signal inspection section 212 of the mobile station 200 may be any of "OK" and "NG" without causing any problem if there is no control information transmitted through the downlink control channel from the base station 100a. Therefore, the control information represented by the downlink-control dummy-pattern signal s113 (FIG. 8) may have a value that is within or out of the suitable range. In short, the downlink-control dummy-pattern signal s113 may be any arbitrary pattern. The uplink-control dummy-pattern signal s123 may be any arbitrary pattern as well.

In the present embodiment, the base station 100a adds error detection code to the dummy pattern, adds intentional bit error sequence to the dummy pattern added with the error detection code, and performs error correction coding of the resultant dummy pattern, if there occurs a radio resource that is not used for transmission of the downlink or uplink control channel among the radio resources allocated to the downlink or uplink control channels. Thereafter, the base station 100a transmits the signal including the bit error sequence and the dummy pattern to the mobile station 200 at a power level lower than the transmission power used for transmission of the control channel.

The transmission of data through the control channel at a significant power (amplitude), when there is no downlink or uplink control channel to be transmitted in the present embodiment, enables reduction of the probability of erroneous detection of CRC=OK that is the problem encountered in the case of setting to DTX in the related technique. In addition, since the base station 100a transmits data through the control channel at the significant power that is lower than the power used in the normal transmission, the interference with a signal transmitted from another sector or another base station can be reduced.

In the present embodiment, the mobile station 200 does not perform decoding in the downlink-data-channel decoding section 204 or coding in the uplink-data-channel coding section 225 if the information showing the result of decoding in the downlink or uplink control channel has a value out of the suitable range or CRC=NG. For this purpose, the base station 100a intentionally transmits the signal including the bit error sequence, to thereby explicitly instruct the mobile station 200 not to perform decoding or coding by using the control information represented by the dummy pattern. Thus, the present embodiment prevents the mobile station 200 from erroneous decoding of the downlink data channel caused by erroneous decoding of the downlink control channel or the unnecessary transmission of data through the uplink data channel caused by erroneous decoding of the uplink control channel.

While the invention has been particularly shown and described with reference to exemplary embodiment thereof, the invention is not limited to these embodiments and modifications. As will be apparent to those of ordinary skill in the art, various changes may be made in the invention without departing from the spirit and scope of the invention as defined in the added claims.

The invention claimed is:

1. A communication method performed by a computer, the method comprising:
creating, by the computer, a dummy pattern added with an error correction code in a base station, during occurring of a downlink or uplink control channel that is not allocated for transmission of control information;
transmitting, by the computer, said dummy pattern instead of control information from said base station to a mobile station through said downlink or uplink control channel that is not allocated for transmission of control information;
decoding, by the computer, control information transmitted through any downlink or uplink control channel, examining whether or not a first value specified by said decoded control information is within a suitable range, and performing error detection of said decoded control information, in any mobile station; and
stopping, by the computer, decoding of data transmitted through a downlink data channel or coding of data to be transmitted through an uplink data channel in said any mobile station, upon judging that said first value is not within said suitable range or detecting an error in said error detection of said decoded control information.

2. The communication method according to claim 1, wherein said dummy pattern includes an error bit pattern representing information that said downlink or uplink control channel transmitting therethrough said dummy pattern is not allocated for transmission of control information.

3. The communication method according to claim 1, wherein said any mobile station judges that said first value is not within said suitable range if said decoded control information includes information corresponding to said error bit pattern.

4. The communication method according to claim 1, wherein said error correction code added to said dummy pattern includes a bit error sequence representing error information.

5. The communication method according to claim 1, wherein said transmitting step transmits said dummy pattern at a first power level that is lower than a power level of normal transmission of control information.

6. The communication method according to claim 5, wherein said first power level does not substantially incur interference with a signal transmitted from another sector or another base station.

7. A method for transmitting control information performed by a computer, the method comprising:
creating, by the computer, a dummy pattern added with an error correction code, during occurring of a downlink or uplink control channel that is not allocated for transmission of control information; and
transmitting, by the computer, said dummy pattern instead of control information through said downlink or uplink control channel that is not allocated for transmission of control information,
wherein said dummy pattern added with said error correction code includes error information and/or wherein said transmitting transmits said dummy pattern at a first power level that is lower than a power level of normal transmission of control data.

8. The communication method according to claim 7, wherein said dummy pattern includes an error bit pattern representing said error information.

9. The communication method according to claim 7, wherein said error correction code added to said dummy pattern includes a bit error sequence representing said error information.

10. The communication method according to claim 7, wherein said first power level does not substantially incur interference with a signal transmitted from another sector or another base station.

11. A method for receiving control information performed by a computer, the method comprising the steps of:
decoding, by the computer, control information transmitted through a downlink or uplink control channel;
examining, by the computer, whether or not a value specified by said decoded control information is within a suitable range;
performing, by the computer, error detection of said decoded control information; and
stopping, by the computer, decoding of data transmitted through a downlink data channel or coding of data to be transmitted through an uplink data channel, upon judging that said value is not within said suitable range or detecting an error in said error detection of said decoded control information.

12. A base station comprising:
hardware;
a dummy-pattern creating section, implemented at least by the hardware, and that creates a dummy pattern added with an error correction code, during occurring of a downlink or uplink control channel that is not allocated for transmission of control information, said dummy pattern added with said error correction code including error information; and
a radio section, implemented at least by the hardware, and that transmits said dummy pattern instead of control information through said downlink or uplink control channel that is not allocated for transmission of control information,
wherein said dummy pattern added with said error correction code includes error information and/or wherein said radio section transmits said dummy pattern at a first power level that is lower than a power level of normal transmission of control data.

13. The base station according to claim 12, wherein said dummy pattern includes an error bit pattern representing said error information.

14. The base station according to claim 12, wherein said error correction code added to said dummy pattern includes a bit error sequence representing said error information.

15. The base station according to claim 12, said first power level does not substantially incur interference with a signal transmitted from another sector or another base station.

16. A mobile station comprising:
hardware;
a control-channel decoding section, implemented at least by the hardware, and that decodes control information transmitted through a downlink or uplink control channel from a base station;
a control-signal inspection section, implemented at least by the hardware, and that examines whether or not a first value specified by said decoded control information is within a suitable range;
an error detection section, implemented at least by the hardware, and that performs error detection of said decoded control information based on an error detection code added in said base station; and
a data-channel decoding section, implemented at least by the hardware, and that stops decoding of data transmitted through a downlink data channel or coding of data to be transmitted through an uplink data channel, upon judging that said first value is not within said suitable range or detecting an error in said error detection of said decoded control information.

17. A communication system comprising:
a base station comprising hardware, a dummy-pattern creation section implemented at least by the hardware and that creates a dummy pattern added with an error correction code, during occurring of a downlink or uplink control channel that is not allocated for transmission of control information, and a radio section implemented at least by the hardware and that transmits said dummy pattern instead of control information to a mobile station through said downlink or uplink control channel that is not allocated for transmission of control information;
and a mobile station comprising hardware, a control-channel decoding section implemented at least by the hardware that decodes control information transmitted through said downlink or uplink control channel, a control-information inspection section implemented at least by the hardware and that examines whether or not a first value specified by said decoded control information is within a suitable range, an error detection section implemented at least by the hardware and that performs error detection of said decoded control information, and a data-channel decoding section implemented at least by the hardware and that stops decoding of a downlink data channel or coding of an uplink data channel, when said control-information inspection section judges that said first value is not within said suitable range or said error detection section detects an error in said decoded control information.

18. The communication system according to claim 17, wherein said dummy pattern includes an error bit pattern representing information that said downlink or uplink control channel transmitting therethrough said dummy pattern is not allocated for transmission of control information.

19. The communication system according to claim 17, wherein said mobile station judges that said first value is not within said suitable range if said decoded control information includes information corresponding to said error bit pattern.

20. The communication system according to claim 17, wherein said error correction code added to said dummy pattern includes a bit error sequence representing error information.

21. The communication system according to claim 17, wherein said radio section transmits said dummy pattern at a first power level that is lower than a power level of normal transmission of control information.

22. The communication system according to claim 21, wherein said first power level does not substantially incur interference with a signal transmitted from another sector or another base station.

23. A computer-readable medium encoded with a program running on a computer, wherein said program causes said computer to:
create a dummy pattern added with an error correction code, during occurring of a downlink or uplink control channel that is not allocated for transmission of control information; and
transmit said dummy pattern instead of control information through said downlink or uplink control channel that is not allocated for transmission of control information,
wherein said dummy pattern added with said error correction code includes error information and/or wherein said dummy pattern is transmitted at a first power level that is lower than a power level of normal transmission of control data.

24. A computer-readable medium encoded with a program running on a computer, wherein said program causes said computer to:
decode control information transmitted through a downlink or uplink control channel;
examine whether or not a first value specified by said decoded control information is within a suitable range;
perform error detection of said decoded control information; and
stop decoding of data transmitted through a downlink data channel or coding of data to be transmitted through an uplink data channel, upon judging that said first value is not within said suitable range or detecting an error in said error detection of said decoded control information.

* * * * *